United States Patent Office 3,827,911
Patented Aug. 6, 1974

---

3,827,911
PREPARATION OF NICKEL ELECTRODES
David F. Pickett, Dayton, Ohio, assignor to the United States of America as represented by the Secretary of the Air Force
No Drawing. Filed Feb. 21, 1973, Ser. No. 334,503
Int. Cl. H01m 43/04
U.S. Cl. 136—24                                     6 Claims

ABSTRACT OF THE DISCLOSURE

A method of preparing nickel electrodes is provided in which a porous nickel plaque, positioned between two nickel sheets, is immersed in an alcoholic solution of nickel nitrate or a mixture of nickel nitrate and cobalt nitrate. After connecting the plaque to the negative pole and the sheets to the positive pole of a power source, a direct current is passed through the solution for a time sufficient to convert the nitrate, which has impregnated pores of the plaque, to the corresponding hydroxide. A nickel electrode so prepared is particularly useful as the positive electrode in nickel-cadmium batteries.

FIELD OF THE INVENTION

This invention relates to a method of preparing nickel electrodes. In one aspect it relates to improved positive nickel electrodes for use in nickel-cadmium batteries.

BACKGROUND OF THE INVENTION

A number of methods for fabricating nickel electrodes are described in the patent literature. In general, the prior art methods involve a multiplicity of steps, including, for example, immersion of a porous nickel plaque in a nickel salt solution, drying the solution-impregnated plaque, cathodization in caustic, washing and drying. It is usually necessary to repeat the sequence of steps several times in order to obtain a nickel electrode which can be used in an electrochemical cell. In U.S. Pat. No. 2,708,212, a process is disclosed in which porous nickel electrodes are prepared by impregnation of the pores of a nickel plaque with an aqueous nickel nitrate solution under vacuum. Thereafter, the plaque is subjected to a cathodic electrolytic process in a sodium hydroxide bath maintained at 100 to 110° C. A similar process is described in U.S. Pat. No. 3,248,266 except that the porous nickel plaque is immersed in a solution of nickel nitrate in an organic solvent.

It is an object of this invention, therefore, to provide a method for preparing nickel electrodes that results in a simplification of the prior art processes.

Another object of the invention is to provide nickel electrodes having a substantial increase in capacity per cubic inch and capacity per pound as compared to electrodes prepared by prior art processes.

A further object of the invention is to provide a low temperature, one-step method for impregnating porous nickel plaques with nickel hydroxide active material.

Other objects and advantages of the invention will become apparent to those skilled in the art upon consideration of the accompanying disclosure.

SUMMARY OF THE INVENTION

The present invention resides in a method of preparing nickel electrodes which comprises the step of passing a direct current from a power source through an alcoholic solution of nickel nitrate or a mixture of nickel nitrate and cobalt nitrate, the solution having disposed therein a porous nickel plaque positioned between a pair of nickel sheets with the plaque being connected to the negative pole and the sheets being connected to the positive pole of the power source, and the direct current being passed through the solution for a time sufficient to convert metal nitrate, which has impregnated pores of the plaque, to the corresponding metal hydroxide. Upon completion of the above step, the nickel electrode so produced is water washed and then dried.

The porous nickel plaques used in the practice of the method of this invention are of the type conventionally used in preparing nickel electrodes. The porosities generally range from 70 to 90 percent with a porosity in the range of 83 to 87 percent being often preferred. In one method of producing a porous nickel plaque, a layer of nickel carbonyl powder placed on each side of a nickel screen in a graphite mold is sintered in a non-oxidizing atmosphere at an elevated temperature and pressure.

In the solution bath, each porous nickel plaque is positioned between a pair of nickel sheets. For example, if a single electrode is being prepared, one plaque is disposed between two nickel sheets. When a plurality of electrodes are fabricated, the number of nickel sheets utilized is greater by one than the number of plaques so that each plaque will be between a pair of sheets. The nickel sheets serving as anodes are connected in parallel while the plaques, which are made cathodic, are likewise connected in parallel. The dimensions of each of the plaques and each of the sheets are usually the same or at least they have substantially the same total surface area. The plaques are generally separated from the sheets by a space of about 0.5 to 1.0 inch.

In conducting the method of this invention, the solution is maintained at about its boiling point. While alcohols other than ethanol can be used in preparing the solution, it is critical that ethanol be used if optimum results are to be obtained. The solution contains in the range of about 10 to 80 volume percent ethanol and 20 to 90 volume percent water. The water and the alcohol form an azeotrope so that the solution boils at a constant temperature of about 80° C. As a practical matter the solution is maintained at a temperature ranging from about 79 to 85° C.

Several advantages accrue from the use of an aqueous alcohol solution. Thus, the presence of the alcohol prevents or inhibits bulk precipitation so that the solution can be reused with a minimum of treatment. The fact that an azeotrope is formed results in a lowering of the boiling point of the solution that remains constant. It is thus possible to utilize plastic containers, such as those formed of polyethylene, polypropylene or polytetrafluoroethylene, in carrying out the method. Also, in the present method it is unnecessary to use a buffer to maintain the pH on the acid side as is necessary when using a pure aqueous solution. It has been found that the pH is usually about 5.0 at the end of impregnation.

The amount of nickel nitrate and cobalt nitrate in solution can be conveniently expressed in terms of nickel and cobalt per liter of solution. Thus, the amount of nickel nitrate and cobalt nitrate is such that there is about 75 to 150 grams of nickel and about 0 to 15 grams of cobalt per liter of solution. It is generally preferred to use a mixture of nickel nitrate and cobalt nitrate because the presence of the latter compound improves the charge acceptance of the electrode being fabricated.

In a preferred embodiment of the method of this invention, the aqueous alcohol solution, as described above, is brought to its boiling point. The porous nickel plaque or plaques and the required number of nickel sheets, spaced apart from one another, are then immersed in the solution. After connecting the plaque or plaques to the negative pole and the sheets to the positive pole of a power supply, current is passed through the circuit. Current is flowed through the solution at a current density of about 0.20 to 0.60, preferably about 0.30 to 0.50, ampere per square inch of geometric area of the plaque or plaques for a period of about 1 to 3 hours. As a result of the passage of current through the solution, nickel hydroxide, as well as cobalt hydroxide if cobalt nitrate is used, precipitates inside the pores of the plaque or plaques. The amount of hydroxide that precipitates in the pores generally ranges from about 1.7 to 2.5 grams per cubic centimeter of plaque void volume.

After completion of the cathodization of the plaques, they are removed from the solution and washed with deionized water. The washing is conveniently accomplished by placing the plaques in a water bath, provided with a stirrer, for a period of about 1 to 3 hours. Thereafter, the washed plaques are dried, preferably in a vacuum oven, which has been purged with an inert gas such as nitrogen or argon, at a temperature of about 75 to 85° C.

A more complete understanding of the invention can be obtained by referring to the following illustrative examples which are not intended, however, to be unduly limitative of the invention.

EXAMPLE I

A run was conducted in which a nickel electrode was prepared in accordance with the method of this invention. There was used a solution containing 50 percent by volume of ethanol and 50 percent by volume of water that was 1.8 molar in nickel nitrate hexahydrate

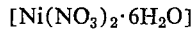
[$Ni(NO_3)_2 \cdot 6H_2O$]

and 0.2 molar in cobalt nitrate hexahydrate

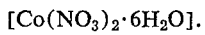
[$Co(NO_3)_2 \cdot 6H_2O$].

The nickel plaque, whose dimensions were 3″ x 3″ x 0.022″, had a porosity of 85±2%. The initial weight of the plaque was 6.8684 grams. After a tab of 270 nickel was spotwelded onto the plaque, its weight was 7.8339 grams. The plaque was placed between two 200 nickel sheets, each of whose dimensions were 3″ x 3″ x 0.050″. The nickel sheets were separated from the plaque by 0.50 inch and were held in place by a Teflon form.

After raising the temperature of the solution to about 79° C., the plaque and nickel sheets were immersed therein. After immersion the plaque was connected to the negative lead of a direct current power supply while the nickel plates were connected to the positive lead of the power supply. A current of 0.35 ampere per square inch of geometric area of the plaque (3″ x 3″ x 0.35 amp./in.² = 3.15 amps) was passed through the circuit, thereby causing precipitation of nickel and cobalt hydroxides inside the pores of the plaque. The time of passage of current was 1 hour and 10 minutes. During this period of impregnation, the temperature of the solution varied from about 79 to 85° C. The pH of the solution was 1.6 (22° C.) before and 4.05 after impregnation as measured with a pH meter.

At the end of the impregnation period, the plaque was removed from the solution and washed for 2 hours in deionized water while stirring. Thereafter, the plaque was dried in a vacuum oven, which had been purged with nitrogen, at about 80° C. and a pressure of 5 to 10 torr. The plaque (Plaque No. 1) was then cooled to room temperature in a nitrogen atmosphere. After cooling, the thickness of the impregnated plaque was measured and found to be 0.0239 inch. The weight of the plaque was 12.5350 grams.

Plaque No. 1 was charged and discharged in 32 percent potassium hydroxide solution in order to establish its electrical charge capacity. The formation cell used was constructed from two cadmium electrodes taken from a Gulton 22 ampere-hour nickel-cadmium aircraft cell and cut to dimensions of 9 square inches. These were used as negative plates, and the result was a three-plate cell. The plates were separated by a layer of standard nylon battery separator. The cell container consisted of a 600 ml. beaker filled with electrolyte to the top of the plates and covered with a five-inch watch glass.

From the weight gain of Plaque No. 1, 5.7011 grams, a theoretical capacity of 1.648 was calculated. The first charge was made at approximately 300 percent of the theoretical capacity, i.e., about 2.5 amperes, for 2 hours. All subsequent charges were made at a percentage of capacity as determined by a constant current discharge of 2.5 amperes to a voltage of 0.9 volt versus a cadmium bar electrode. For example, the first discharge took 18.42 minutes corresponding to 0.768 ampere-hour. The second charge was made at 300 percent of this capacity or 2.5 amperes for 92.16 minutes. The third charge was made at 180 percent of this capacity or 2.5 amperes for 33.16 minutes. All charge and discharge currents were 2.5 amperes. In Table I below, the results of representative cycles of the 37 charge-discharge cycles that were conducted are shown.

TABLE I

| Cycle No. | Percent charge[1] | Charging time, minutes | Discharge time, minutes | Capacity, amp-hr. | Percent utilization of active material[2] |
|---|---|---|---|---|---|
| 1 | | 120 | 18.42 | 0.768 | 46.6 |
| 2 | 300 | 92.16 | 18.42 | 0.768 | 46.6 |
| 3 | 180 | 33.16 | 20.00 | 0.833 | 50.5 |
| 5 | 150 | 35.24 | 25.21 | 1.050 | 65.7 |
| 13 | 150 | 41.33 | 27.77 | 1.157 | 70.2 |
| 20 | 150 | 49.07 | 33.37 | 1.363 | 82.7 |
| 26 | 150 | 52.38 | 35.68 | 1.487 | 90.2 |
| 37 | 150 | 54.66 | 36.61 | 1.525 | 92.5 |

[1] Based on capacity of previous discharge. Initial charge 300% of theoretical capacity.
[2] Assuming discharge reaction is $2NiOOH + Cd + H_2O \rightarrow 2Ni(OH)_2 + Cd(OH)_2$.

After cycling, the electrode (Plaque No. 1) was removed from the cell, washed in deionized water and then dried in vacuo.

EXAMPLE II

Two runs were conducted in which essentially the same procedure as that described in Example I was followed. In one run, a single porous nickel oxide plaque (Plaque No. 2) was impregnated as in Example I. In the second run, 4 plaques (Plaque Nos. 3, 4, 5, and 6) were impregnated simultaneously in 7 liters of solution in an 18 liter Pyrex vessel. The results of these runs and the run of Example I as well as other information regarding the plaques are summarized hereinafter in Table II.

TABLE II

| Plaque No. | Weight before tab (g.) | Weight after tab (g.) | Thickness before impregnation (in.) | Weight after impregnation (g.) | Weight gain (g.) | Thickness after (in.) | Current density, amp/sq. in. | Impregnation time, (hrs.) | Capacity density, amp-hr./cu. in.[1] |
|---|---|---|---|---|---|---|---|---|---|
| 1 | 5.8584 | 7.8339 | 0.0220 | 12.5350 | 5.7011 | 0.0239 | 0.35 | 1.17 | 6.20 |
| 2 | 8.2778 | 9.2440 | 0.0306 | 16.0520 | 6.8080 | 0.0372 | 0.35 | 2.50 | 8.19 |
| 3 | 8.2216 | 9.1282 | 0.0309 | 16.3125 | 7.1843 | 0.0321 | 0.35 | 2.00 | 7.42 |
| 4 | 8.1145 | 9.0827 | 0.0308 | 16.1139 | 7.0312 | 0.0319 | 0.35 | 2.00 | 7.44 |
| 5 | 8.4380 | 9.3306 | 0.0296 | 16.1587 | 6.8281 | 0.0307 | 0.35 | 2.00 | 7.75 |
| 6 | 8.3716 | 9.2887 | 0.0305 | 16.1155 | 6.8268 | 0.0320 | 0.35 | 2.00 | 7.81 |

[1] After 20 to 40 charge-discharge cycles.

EXAMPLE III

Two cells were fabricated, the first with the electrode prepared as described in Example I (Plaque No. 1) and the second with an electrode taken from a standard 34 ampere-hour commercial aircraft cell. The commercial electrode was cut to the same volume as Plaque No. 1.

Each cell had two negative plates taken from a commercial 34 ampere-hour cell that were cut to the dimensions of the positive electrodes. The plates were separated by a standard nylon battery separator. The following are the exact measurements of the positive electrodes:

|  | Cell #1 made with Plaque #1 | Cell #2 made with commercial electrode |
|---|---|---|
| Wt. of positive electrode, g | 11.9452 | 15.9595 |
| Average thickness, in | 0.0249 | 0.0334 |
| Dimensions, in | 3 x 3 | 2.781 x 2.41 |
| Volume, in.³ | 0.2241 | 0.2241 |
| Electrolyte | 32% KOH | 32% KOH |

Both cells were charged and discharged at 2.5 amperes. The cells were discharged to 0.9 volt. Charge and discharge times and capacities are shown hereinafter in Table III.

TABLE III

| | Cell #1 | | | Cell #2 | | |
|---|---|---|---|---|---|---|
| Cycle No. | Charging time, minutes | Discharge time, minutes | Capacity, amp-hrs. | Charging time, minutes | Discharge time, minutes | Capacity, amp-hrs. |
| 1 | 55.0 | 31.67 | 1.320 | 55.0 | 25.73 | 1.072 |
| 2 | 46.51 | 32.56 | 1.357 | 38.60 | 27.00 | 1.125 |
| 3 | 48.84 | 33.16 | 1.382 | 45.00 | 28.61 | 1.192 |
| 4 | 49.74 | 33.34 | 1.389 | 42.92 | 28.78 | 1.199 |
| 5 | 50.01 | 33.34 | 1.389 | 43.17 | 29.20 | 1.216 |
| 6 | 50.01 | 33.34 | 1.389 | 43.80 | 29.67 | 1.236 |
| 7 | 50.01 | 33.57 | 1.399 | 44.51 | 30.82 | 1.283 |
| 8 | 50.36 | 33.57 | 1.399 | 46.23 | 31.20 | 1.300 |
| 9 | 50.36 | 33.44 | 1.393 | 46.80 | 32.00 | 1.333 |
| 10 | 50.16 | 33.34 | 1.389 | 48.00 | 32.85 | 1.369 |

Taking the final discharge capacity of both cells, the positive electrode from Cell #1 (Plaque No. 1) had a specific capacity of 6.20 ampere per cubic inch while the electrode from Cell #2 had a capacity of 5.69 ampere-hours per cubic inch. Stated another way, the electrode from Cell #1 had a capacity density of 52.7 ampere-hours per pound, and the electrode from Cell #2 had a capacity density of 38.9 ampere-hours per pound. The charge-discharge data show that there was no significant loss of capacity during cycling of Cell #1 at a relatively high rate of charge and discharge. Also, the capacity of Cell #1 remains as good or better than that of the cell with the commercial electrode.

EXAMPLE IV

A second pair of cells, Cells #3 and #4, were made substantially as described in Example III. However, Plaque No. 2 was used as the positive electrode for Cell No. 3. The following are the exact measurements of the positive electrodes:

|  | Cell #3 made with Plaque #2 | Cell #4 made with commercial electrode |
|---|---|---|
| Wt. of positive electrode, g | 16.0520 | 20.2533 |
| Dimensions, in | 3 x 3 x 0.0372 | (¹) |
| Volume, in | 0.3348 | 0.3348 |
| Electrolyte | 32% KOH | 32% KOH |

¹ (3.68 x 2.75 x 0.324)+(0.4 x 0.5 x 0.3).

Cells #3 and #4 were charged and discharged at 2.5 amperes. The cells were discharged to 0.9 volt potential between the positive electrode and a reference cadmium electrode. At cycle 21 Cell #4 short circuited from active material growing through the separator. After re-wrapping, the cell continued cycling at about the same capacity, i.e., about 2.0 ampere-hours. After 32 cycles, Cell #3 had a capacity of 2.208 ampere-hours. The following is a comparison of the electrodes of Cells #3 and #4:

| Electrode | Capacity per cu. in. (amp-hr./in.³) | Capacity per pound (amp-hr./lb.) |
|---|---|---|
| Cell #3 (Plaque No. 2) | 8.19 | 62.4 |
| Cell #4 (commerical electrode) | 6.08 | 43.2 |

From the data in the foregoing examples, it is seen that the present invention provides a simplified method for preparing a nickel electrode. Furthermore, the electrodes demonstrate a substantial increase in capacity per cubic inch and capacity per pound as compared to commercial electrodes.

Various modification of the present invention may be made or followed by those skilled in the art upon consideration of the foregoing disclosure without departing from the spirit or scope of the invention.

I claim:

1. A method of preparing a nickel electrode which comprises the step of passing a direct current from a power source through an alcoholic solution of nickel nitrate or a mixture of nickel nitrate and cobalt nitrate, the solution having disposed therein a porous nickel plaque positioned between a pair of nickel sheets with the plaque being connected to the negative pole and the sheets being connected to the positive pole of the power source, and the direct current being passed through the solution for a time sufficient to convert metal nitrate in the pores of the plaque to the corresponding metal hydroxide.

2. The method according to claim 1 in which the alcoholic solution contains in the range of about 10 to 80 volume percent ethanol and 20 to 90 volume percent water, and the solution is maintained at a temperature ranging from about 79 to 85° C.

3. The method according to claim 2 in which the amount of nickel nitrate and cobalt nitrate in solution, expressed in terms of nickel and cobalt, is about 70 to 150 grams of nickel and about 0 to 15 grams of cobalt per liter of solution.

4. The method according to claim 3 in which current is passed through the solution at a current density of about 0.20 to 0.60 ampere per square inch of geometric area of the porous nickel plaque, for a period of about 1 to 3 hours.

5. The method according to claim 4 in which current is passed through the solution at a current density of about 0.30 to 0.50 ampere per square inch of geometric area of the porous nickel plaque for a period of about 1 to 3 hours.

6. A method according to claim 4 in which the porous nickel plaque impregnated with metal hydroxide is removed from the solution, washed with deionized water, and dried under a vacuum at the temperature of about 75 to 85° C.

References Cited

UNITED STATES PATENTS

| | | | |
|---|---|---|---|
| 3,248,266 | 4/1966 | Rampel | 136—75 |
| 3,284,237 | 11/1966 | Lambert et al. | 136—24 |
| 3,356,534 | 12/1967 | Ackermann | 136—29 X |
| 3,533,842 | 10/1970 | Hart | 136—29 |
| 3,600,227 | 8/1971 | Hardman | 136—76 |

ANTHONY SKAPARS, Primary Examiner

U.S. Cl. X.R.

136—29, 76